United States Patent [19]

Koster

[11] Patent Number: 5,316,713
[45] Date of Patent: May 31, 1994

[54] RUBBER TUBE MANUFACTURE, WITH FILM LAMINATE OVERWRAP

[75] Inventor: Edward Koster, Mississauga, Canada

[73] Assignee: Du Pont Canada Inc., Mississauga, Canada

[21] Appl. No.: 935,319

[22] Filed: Aug. 26, 1992

[51] Int. Cl.$^5$ .................... B29C 41/00; B29D 23/22
[52] U.S. Cl. .................... 264/209.1; 156/184; 264/316; 264/319
[58] Field of Search ............... 156/148, 149, 143, 184, 156/190; 264/103, 316, 236, 347, 319, 324, 209.1

[56] References Cited

U.S. PATENT DOCUMENTS

| 2,444,903 | 7/1948 | Van Buren | 264/316 |
| 2,705,227 | 3/1955 | Stamatoff | 264/184 |
| 3,883,384 | 5/1975 | Hopkins | 264/236 |
| 4,324,607 | 4/1982 | Dugger | 156/143 |
| 4,559,095 | 12/1985 | Babbin | 156/148 |
| 4,737,210 | 4/1988 | Dougherty | 156/148 |
| 4,762,589 | 8/1988 | Akiyama et al. | 156/331.2 |

FOREIGN PATENT DOCUMENTS

| 1171225 | 7/1984 | Canada. |
| 48-60775 | 8/1973 | Japan. |
| 63-151438A | 6/1988 | Japan. |

*Primary Examiner*—Jeffery Thurlow
*Assistant Examiner*—Mathieu Vargot
*Attorney, Agent, or Firm*—Konrad S. Kaeding

[57] ABSTRACT

A process for the manufacture of tubular rubber articles includes a) forming a tube of uncured rubber on a mandrel; b) wrapping the tubular rubber by winding with a film laminate including i) at least one layer of a heat stabilized, oriented nylon film having a thickness of from 13 to 50 μm and having a shrinkage of 2 to 10% in the machine direction, laminated to ii) at least one heat stabilized film selected from an oriented nylon film having a thickness of from 13 to 50 μm and having a shrinkage of 2 to 10% in the machine direction, or a cast nylon film having a thickness of from 15 to 155 μm and having a shrinkage of 0.5 to 1.5% in the machine direction; and c) curing the rubber at an elevated temperature.

17 Claims, No Drawings

RUBBER TUBE MANUFACTURE, WITH FILM LAMINATE OVERWRAP

The present invention relates to the manufacture of sheets, tubing, gaskets, hoses, rubber-covered rolls and the like from vulcanizable rubber.

In the manufacture of rubber sheets, hoses and the like, unvulcanized ("green") rubber sheet, typically 0.8 to 5.0 mm in thickness, is wound onto a metal mandrel until the sheet is built up to the desired thickness of the article being produced, e.g. hose, or the desired length of sheeting, e.g. roofing membranes. The cylindrical assembly thus formed is then wound (often spirally wound), tightly, with a film or textile woven cloth and the assembly is vulcanized, for example in a steam autoclave. Vulcanization takes place at elevated temperatures over a period of time. Typically vulcanization takes place at a temperature of 155° C. for a period of from four to ten hours for roofing membranes, and at a temperature of 155° C. for a period of one hour for gasket material. Typical wrapping materials used commercially include polypropylene film and cloth woven from nylon fibres. The purpose of the wrapping material is to provide pressure on the article, in the radial direction during the vulcanization (curing) cycle. The wrapping material is subsequently recovered and either reused, in the case of textile nylon cloth, or discarded, in the case of polypropylene film. Polypropylene film suffers from the disadvantage that the resulting cured rubber articles have poor uniformity and wrinkles due to sagging of the film during the curing cycle because of the inability of the polypropylene film to shrink at a rate similar to the rate of shrinkage of the cured article. Woven nylon cloth is adequate in its first use but its shrinkage abilities deteriorate in subsequent uses and it tends to be costly. The use of heat stabilized oriented nylon film having a machine direction shrinkage as measured by ASTM Procedure D-1204-84 of from at least 2% to about 10% is also known. However, such film suffers from a propensity to tear or split in the machine direction during the vulcanization process, especially in wet steam at the higher temperature ranges (above 150° C.) or when pressure spikes occur in the autoclave.

The present invention seeks to overcome the disadvantages of the prior art wrapping materials.

Accordingly the present invention provides a process for the manufacture of tubular or sheet rubber articles comprising:

a) forming a tube of uncured rubber on a mandrel;

b) wrapping the tubular rubber by winding with a film laminate comprising i) at least one layer of a heat stabilized, oriented nylon film having a thickness of from 13 to 50 $\mu$m and having a shrinkage of 2 to 10% in the machine direction, laminated to ii) at least one heat stabilized film selected from an oriented nylon film having a thickness of from 13 to 50 $\mu$m and having a shrinkage of 2 to 10% in the machine direction, or a cast nylon film having a thickness of from 15 to 155 $\mu$m and having a shrinkage of 0.5 to 1.5% in the machine direction; and c) curing the rubber at an elevated temperature.

As used herein the term "nylon" encompasses film forming aliphatic polyamides.

In one embodiment the tube of uncured rubber is formed by tightly winding a sheet of uncured rubber onto the mandrel.

In another embodiment the tube of uncured rubber is formed by extruding uncured rubber into a tube and placing the tube onto the mandrel.

In a preferred embodiment at least one of the films of the laminate is a nylon film made from an aliphatic dicarboxylic acid and an aliphatic diamine, each having from 6 to 24 carbon atoms.

In another embodiment at least one of the films of the laminate is a nylon film made from an aliphatic amino acid having from 6 to 24 carbon atoms.

In a further embodiment at least one of the films of the laminate is a nylon film made from a copolymer of an aliphatic dicarboxylic acid and an aliphatic diamine, each having from 6 to 24 carbon atoms, and an aliphatic aminoacid having from 6 to 24 carbon atoms.

Particularly preferred nylon films are made from nylon 6,6, nylon 6 and mixtures thereof. Nylon 6,6 is especially preferred.

In embodiments where the nylon is cast, and optionally oriented thereafter, and wherein the nylon is nylon 6 it is preferred that the intrinsic viscosity (IV) is in the range of 0.65 to 1.3 dl/g. It is preferred that the intrinsic viscosity be in the range of 0.95 to 1.2 dl/g, particularly 1.0 to 1.1 dl/g. Intrinsic viscosity is measured at 25° C. in formic acid (85 wt. % acid to 15 wt. % water) by methods known in the art.

In embodiments where the nylon is cast, and optionally oriented thereafter, and wherein the nylon is nylon 6,6 it is preferred that the relative viscosity (RV) in the range of 25 to 85, particularly 40 to 85 end more particularly 45 to 60. Relative viscosity is the ratio of viscosity at 25° C. of an 8.4 wt. % solution of nylon in 90 wt. % formic acid (90 wt. % acid to 10 wt. % water) to the viscosity at 25° C. of the 90 wt. % formic acid alone.

Those skilled in the art will recognize that when the nylon film is made in a blown film process the nylon needs a relatively high melt strength. For example, when the nylon is nylon 6,6 relative viscosities of as high as about 225 are used in order to give the necessary melt strength.

The nylon may be a blend of nylons, e.g. nylon 6,6 having a relative viscosity of 50 and nylon 6,6 having a relative viscosity of 85. The nylon may also be a blend of different nylons e.g. nylon 6 and nylon 6,6. Furthermore the nylon may be a copolymer of nylon 6 and nylon 6,6.

In a further embodiment the oriented nylon film has a machine direction shrinkage of from 2 to 10%, and especially 2% to 7%.

In another embodiment the nylon films of the laminate each have a thickness of from 13 to 25 $\mu$m.

The heat stabilizer for the nylon film may be an additive known to protect nylons from degradation at elevated temperatures. For example, U.S. Pat. No. 2,705,227 to G. S. Stamatoff which issued Mar. 29, 1955 discloses that a combination of a copper compound and an inorganic halide is useful as a heat stabilizer. Suitable copper compounds include copper salts of alkanoic acids, e.g. acetic, butyric, lauric, palmitic and stearic acids. Suitable inorganic halides include alkali metal halides and alkaline earth metal halides, particularly sodium and potassium bromides or iodides. When such heat stabilizers, i.e. copper compounds and inorganic halides are used in the present invention, the preferred concentration range is from 30 to 200 ppm copper in the film. Below 30 ppm the film tends to become brittle and will break or fibrillate in the vulcanization part of the process.

Preferred heat stabilizers are a combination of cupric acetate and potassium bromide or a combination of cuprous iodide and potassium iodide. The preferred amount of copper in the stabilizer is from 50 to 200 ppm, especially from 80 to 150 ppm.

Another class of heat stabilizers are known for their antioxidant properties in polymers, some of which have been found useful in nylons, and some of which have particular activity in other polymers, e.g. polyolefins. Such antioxidants are hindered phenolic antioxidants, or a mixture of a hindered phenolic antioxidant with a secondary antioxidant or stabilizer. The ratio of phenolic antioxidant to secondary antioxidant or stabilizer may be in the range of 0.25:1 to 1:2 with the total concentration of antioxidant being in the range of 200 to 800 ppm. Examples of suitable hindered phenolic antioxidants are 1,3,5-trimethyl-2,4,6,tris (3,5-di-tertbutyl-4-hydroxybenzyl)-benzene, octadecyl-3,5, di-tert-butyl-4-hydroxy cinnamate, tetrakis-methylene-3-(3,5-di-tert-butyl-4-hydroxyphenyl)-propionate methane, octadecyl-3-(3,5-di-tert-butyl-4-hydroxyphenyl)propionate 2,5-di-tert-butyl hydroquinone, 2,2-methyl-bis (4-methyl-6-tert-butyl phenol), 2,2-methylene-bis(4-ethyl-6-tert-butyl phenol), 4,4-butylidene-bis(6-tert-butyl-m-cresol) and N,N-hexamethylene bis-(3,5-di-tert-butyl-4-hydroxyhydrocinnamamide). Examples of secondary antioxidants are di-(stearyl)-pentaerythritol diphosphite, tris (2,4-di-tert-butyl phenyl)phosphite, dilauryl thiodipropionate and bis (2,4,-di-tert-butyl) pentaerythritol diphosphite. A preferred antioxidant is sold under the trade mark Irganox B 1171, and is a 1:1 mixture of N,N-hexamethylenebis (3,5 di-tert-butyl-4-hydroxyhydrocinnamamide) and tris (2,4 di-tert-butylphenyl)-phosphite. The preferred concentration of antioxidant is from 400 to 600 ppm.

The nylon films useful in the laminate of the present invention may also contain other additives, fillers and the like, such as glass, mica, dyes, antioxidants, UV stabilizers and slip additives, e.g. slip additives containing silica.

The nylon films may be made by known methods using conventional film forming extrusion apparatus. For example, the oriented nylon films useful in the present invention may be prepared by extruding the nylon through a flat film die having a die gap of from 400 to 1400 μm, rapidly cooling the extruded film to a temperature of from about 25° to 100° C., machine direction orienting the film at a draw ratio of from 2.8 to 3.5 and optionally annealing the film at a temperature of from about 60° to 150° C. The oriented nylon film used in the present invention may also be prepared by extruding the nylon in a molten state through a circular die, in a so-called blown film process, rapidly cooling the extruded blend to form film while expanding the extruded blend at a blow-up ratio of at least about 3.0:1, and optionally annealing the film at a temperature of from 10° to 100° C. The nylon film may also be made by certain biaxial orientation processes. The cast film used in the present invention may be prepared by extruding the nylon through a flat film die having a die gap of from 400 to 1400 μm, rapidly cooling the extruded film to a temperature of from about 25° to 100° C.

A suitable machine direction orientation process is disclosed in Canadian Patent 1 171 225, which issued Jul. 24, 1984 to B. L. Hetherington, P. H. Gray and A. N. Mollison. A suitable biaxial orientation process is disclosed in J48-60775 to Unitika KK. Machine direction orientation processes are preferred for reasons of ease of manufacture and capital cost.

Machine direction shrinkage of the nylon film is measured using ASTM Procedure No. D-1204-84 performed at 150° C. for 30 mins. Machine direction shrinkage of the nylon film laminate useful in the present invention should be from at least 2% to about 10%, preferably from 2 to 9% and even more preferably from 2% to 7%. The desired machine direction shrinkage is obtained by altering the processing parameters in the film manufacturing process as is known in the art.

Lamination of the nylon films useful in the present invention is carried out using conventional lamination processes, using a heat stable laminating adhesive, e.g. a urethane adhesive. An example of such an adhesive is Adcote (trade mark) 76T3A urethane adhesive from Morton Chemicals.

The tubular or sheet rubber articles are made in accordance with known methods, with the exception of using the above described film laminate as an overwrap. In one such method, uncured rubber sheet is tightly wound onto a mandrel, the rubber is overwrapped with the film laminate and then the rubber is cured at elevated temperatures. In another method, uncured rubber is extruded into tubes and placed on an appropriately sized mandrel, the rubber is overwrapped with the film laminate and then the rubber is cured at elevated temperatures. In some processes the overwrap material is spirally wound onto the uncured article. In some spiral wrapping processes the uncured rubber is wrapped until several layers, e.g. two or three layers, have been wound round the uncured rubber. In other processes the overwrap is wound without it being spirally wound, e.g. radially wound, as is known in the art. Typically for hoses the rubber may be an ethylene-propylene-diene monomer type, otherwise known as an EPDM rubber, natural rubber, butyl rubber, nitrile rubber or styrene-butadiene type, otherwise known as SBR. For conveyor belts, typically the rubber is natural rubber or SBR and, for V-belts, typically the rubber is natural rubber, neoprene or SBR. Other rubber types may be used in special applications.

In the methods in which sheet rubber is wound onto a mandrel, the sheet of rubber is typically 6 to 15.25 m wide, up to about 120 m long and from 0.8 to 5.0 mm thick. The sheet is wound onto the metal mandrel, with sufficient windings to ensure that the tube of rubber so formed is of the correct thickness or length for the article being manufactured. For making rubber sheeting, there is an interleaving or talc dusting between windings of the rubber sheet in order to achieve separation of the windings after curing the rubber. For making hoses and the like there is no such interleaving or dusting. In methods in which uncured rubber is extruded from a circular die, the extruded rubber has the internal and external diameters approximately the same as those of the finished article. For example, in order to make rubber hose, the wall thickness of the hose is typically from 5 to 10 mm, and in order to make gaskets the thickness is typically from 5 to 20 mm.

The rubber article may be reinforced by the inclusion of woven cloth or other material in the tube, as disclosed, for example, in J63-151438A to Yokohama Rubber. This reference discloses that after a polyamide film having a melting point of 70° to 160° C., is spirally wrapped onto a mandrel, which is made of resin or rubber, and coated with a mould release agent, a rubber inner tube, a fibre reinforced layer and a rubber outer tube are laminated together on the mandrel to form a laminated hose. The polyamide layer is molten, fused to the rubber layers, and cured before the mandrel is pulled out. The polyamide film, in this case, provides an easy covering for the mandrel.

In the present invention the tubular uncured rubber article is wrapped with the heat stabilized nylon film laminate, by winding the film laminate under tension. In spiral wound processes the film laminate edges are overlapped to cover the surface of the rubber tube completely and uniformly. The over-wrapped assembly is vulcanized by methods known in the art. The assembly is then cooled and the nylon over-wrap film laminate is removed and discarded. In the case of cured rubber sheet, e.g. roofing membranes, the sheet is unwound from the steel mandrel and cut to desired size. In the case of cured rubber tubes, hoses and the like the tube is removed from the mandrel and cut to length. In the case of gasket material, the cured rubber tube is removed from the mandrel and sliced into narrow gaskets.

The invention is exemplified by the following examples:

EXAMPLE 1

Film laminate A was prepared from a heat stabilized machine direction oriented nylon 6,6 film and a cast nylon 6,6 heat stabilized film. The oriented film had a thickness of 19 μm and a machine direction shrinkage of 6.2%, as determined by ASTM Procedure D-1204-84 performed at 150° C. for 30 mins. The cast film had a thickness of 15 μm. Although the machine direction shrinkage of this sample of cast film was not measured, measurements on cast films made under similar conditions heve been measured at about 1.0%. The nylon films were heat stabilized with cupric acetate (75 ppm Cu) and 2000 ppm potassium bromide. The films were laminated using from about 2.45 g/m$^2$ to 3.27 g/m$^2$ Adcote 76T3A urethane adhesive. The resulting laminate had a machine direction shrinkage of 4.7%.

Laminate A was used in a process for making rubber gaskets. Uncured rubber was extruded through a circular die to form a tube 130 mm outside diameter. 100 cm lengths of the tube were placed on a steel mandrel. The tubes were dusted with talc and overwrapped with 8 cm wide Laminate A, by winding the film laminate in a spiral fashion under tension and overlapping the film laminate edges to cover the surface of the wound rubber tube completely and uniformly. The over-wrapped assembly was vulcanized in a large live steam autoclave at 150° C. for 1 h. After cooling the assembly, the nylon over-wrap film laminate was removed and discarded. The cured rubber was then removed from the steel mandrel and cut into gaskets. No, or minimal, splitting or tearing of the laminate occurred, either in the vulcanization process or in the laminate removal step.

EXAMPLE 2

Film laminate B was prepared from two heat stabilized machine direction oriented nylon 6,6 films. Each of the films had a thickness of 19 μm and a machine direction shrinkage of 6.2%, as determined by ASTM Procedure D-1204-84 performed at 150° C. for 30 mins. The cast. The nylon films were heat stabilized with cupric acetate (75 ppm Cu) and 2000 ppm potassium bromide. The films were laminated using from about 2.45 g/m$^2$ to 3.27 g/m$^2$ Adcote 76T3A urethane adhesive. The resulting laminate had a machine direction shrinkage of 5.9%. A similar gasket making process was used as in Example 1, except that the tube was overwrapped with Laminate B. The overwrapped assembly was vulcanized in a large live steam autoclave at 150° C. for 1 h. After cooling the assembly, the nylon overwrap film laminate was removed and discarded. The cured rubber was then removed from the steel mandrel and cut into gaskets. No, or minimal, splitting or tearing of the laminate occurred, either in the vulcanization process or in the laminate removal step.

EXAMPLE 3

A similar process was used in this Example as was used in Example 1 except that a length of unvulcanized tube was simply wound with 51 cm wide Laminate A, two or three times around the tube. Again, the assembly was vulcanized in a large live steam autoclave at 150° C. for 1 h. After cooling the assembly, the nylon overwrap film laminate was removed and discarded. The cured rubber was then removed from the steel mandrel and cut to size. No, or minimal, splitting or tearing of the laminate occurred, either in the vulcanization process or in the laminate removal step.

EXAMPLE 4

Rubber hoses were made by manually building up layers of rubber until the hoses had outside diameters of from 5 to 10 cm. 30–45 cm lengths were taken, placed on a mandrel, overwrapped with 8 cm wide film Laminate A, spirally wrapping two or three times about the hose, and similarly processed as described in Example 1 except that the autoclave processing occurred at 150° C. for 80 minutes. No, or minimal, splitting or tearing of the laminate occurred, either in the vulcanization process or in the laminate removal step. The experiments were repeated using Laminate B and again, no, or minimal, splitting or tearing of the laminate occurred.

COMPARATIVE EXAMPLE

The vulcanization processes of Examples 1 to 4 were repeated except that he overwrap films were heat stabilized machine direction oriented nylon 6,6, monolayer films, each having a thickness of between 25 and 40 μm and a machine direction shrinkage of 6.2%. The films were heat stabilized with cupric acetate (75 ppm Cu) and 2000 ppm potassium bromide. The films tended to split excessively in the machine direction and were unacceptable.

I claim:

1. A process for the manufacture of tubular rubber articles comprising:
    a) forming a tube of uncured rubber on a mandrel;
    b) wrapping the tubular rubber by winding with a film laminate comprising
        i) at least one layer of a heat stabilized, oriented nylon film having a thickness of from 13 to 50 μm and having a shrinkage of 2 to 10% in the machine direction, laminated to
        ii) at least one heat stabilized film selected from the group consisting of
    (A) an oriented nylon film having a thickness of from 13 to 50 μm and having a shrinkage of 2 to 10% in the machine direction, and
    (B) a cast nylon film having a thickness of from 15 to 155 μm and having a shrinkage of 0.5 to 1.5% in the machine direction;
    c) curing the rubber at an elevated temperature;
    d) cooling the tube; and
    e) removing the film laminate from the tube.

2. A process according to claim 1 wherein at least one of the films of the laminate is a nylon film made from an aliphatic dicarboxylic acid and an aliphatic diamine, each having from 6 to 24 carbon atoms.

3. A process according to claim 1 wherein at least one of the films of the laminate is a nylon film made from an aliphatic amino acid having from 6 to 24 carbon atoms.

4. A process according to claim 1 wherein at least one of the films of the laminate is a nylon film made from a copolymer of an aliphatic dicarboxylic acid and an aliphatic diamine, each having from 6 to 24 carbon atoms, and an aliphatic amino acid having from 6 to 24 carbon atoms.

5. A process according to claim 1 wherein at least one of the films of the laminate is of nylon selected from the group consisting of nylon 6,6, nylon 6 and mixtures thereof.

6. A process according to claim 1 wherein the oriented nylon film i) and ii) (A) of the laminate has a machine direction shrinkage of from 2% to 7%.

7. A process according to claim 5 wherein the oriented nylon film of the laminate has a machine direction shrinkage of from 2% to 7%.

8. A process according to claim 1 wherein at least one of the oriented nylon films i) and ii) (A) is machine direction oriented.

9. A process according to claim 2 wherein at least one of the nylon films i) and ii) (A) is machine direction oriented.

10. A process according to claim 2 wherein the uncured rubber tube is formed by a) tightly winding a sheet of uncured rubber onto the mandrel or b) first extruding a tube of uncured rubber and then placing said extruded tube onto the mandrel.

11. A process according to claim 3 wherein the uncured rubber tube is formed by a) tightly winding a sheet of uncured rubber onto the mandrel or b) first extruding a tube of uncured rubber and then placing said extruded tube onto the mandrel.

12. A process according to claim 4 wherein the uncured rubber tube is formed by a) tightly winding a sheet of uncured rubber onto the mandrel or b) first extruding a tube of uncured rubber and then placing said extruded tube onto the mandrel.

13. A process according to claim 5 wherein the uncured rubber tube is formed by a) tightly winding a sheet of uncured rubber onto the mandrel or b) first extruding a tube of uncured rubber and then placing said extruded tube onto the mandrel.

14. A process according to claim 1 wherein each of the nylon films of the laminate have a thickness of from 13 to 25 $\mu$m.

15. A process for the manufacture of tubular rubber articles comprising:
   A) forming a tube of uncured rubber on a mandrel by
      i) tightly winding a sheet of uncured rubber onto the mandrel or
      ii) first extruding a tube of uncured rubber and then placing said extruded tube onto the mandrel;
   B) wrapping the tubular rubber, by winding, with a film laminate comprising
      a) at least one layer of a heat stabilized, oriented nylon 6,6 film having a thickness of from 13 to 50 $\mu$m and having a shrinkage of 2 to 10% in the machine direction, laminated to
      b) at least one heat stabilized film selected from the group consisting of
         (I) an oriented nylon 6,6 film having a thickness of from 13 to 50 $\mu$m and having a shrinkage of 2 to 10% in the machine direction, and
         (II) a cast nylon 6,6 film having a thickness of from 15 to 155 $\mu$m and having a shrinkage of 0.5 to 1.5% in the machine direction;
   c) curing the rubber at an elevated temperature;
   d) cooling the tube; and
   e) removing the film laminate from the tube.

16. A process according to claim 15 wherein each of the nylon films a) and b) (I) of the laminate has a machine direction shrinkage of from 2% to 7%.

17. A process according to claim 15 wherein each of the nylon films of the laminate have a thickness of from 13 to 25 $\mu$m.

* * * * *